United States Patent
Kaplan et al.

(10) Patent No.: US 10,303,480 B2
(45) Date of Patent: May 28, 2019

(54) UNIFIED STORE QUEUE FOR REDUCING LINEAR ALIASING EFFECTS

(71) Applicant: ADVANCED MICRO DEVICES, INC., Sunnyvale, CA (US)

(72) Inventors: David A Kaplan, Austin, TX (US); Daniel Hopper, Austin, TX (US); John M. King, Austin, TX (US); Jeff Rupley, Round Rock, TX (US)

(73) Assignee: Advanced Micro Devices, Santa Clara, CA (US)

( * ) Notice: Subject to any disclaimer, the term of this patent is extended or adjusted under 35 U.S.C. 154(b) by 1000 days.

(21) Appl. No.: 14/067,564

(22) Filed: Oct. 30, 2013

(65) Prior Publication Data
US 2015/0121010 A1   Apr. 30, 2015

(51) Int. Cl.
*G06F 9/38* (2018.01)
*G06F 12/0875* (2016.01)

(52) U.S. Cl.
CPC .......... *G06F 9/3834* (2013.01); *G06F 9/3826* (2013.01); *G06F 12/0875* (2013.01); *Y02D 10/13* (2018.01)

(58) Field of Classification Search
CPC ........................... G06F 12/0875; G06F 9/3834
See application file for complete search history.

(56) References Cited

U.S. PATENT DOCUMENTS

| | | | | |
|---|---|---|---|---|
| 5,621,896 A | * | 4/1997 | Burgess | G06F 9/3824 711/118 |
| 5,644,752 A | * | 7/1997 | Cohen | G06F 12/0897 711/121 |
| 6,021,485 A | * | 2/2000 | Feiste | G06F 9/3816 712/216 |
| 2003/0177312 A1 | * | 9/2003 | Baktha | G06F 9/3834 711/118 |
| 2008/0082765 A1 | * | 4/2008 | Hily | G06F 9/3824 711/154 |
| 2009/0157943 A1 | * | 6/2009 | Robinson | G06F 9/3834 711/100 |
| 2010/0228952 A1 | * | 9/2010 | Bean | G06F 9/30054 712/205 |
| 2011/0035561 A1 | * | 2/2011 | Zeffer | G06F 9/3004 711/156 |
| 2012/0059971 A1 | * | 3/2012 | Kaplan | G06F 12/0897 711/3 |
| 2012/0110304 A1 | * | 5/2012 | Bryant | G06F 9/30141 712/29 |
| 2012/0117323 A1 | * | 5/2012 | Cypher | G06F 12/0855 711/118 |

* cited by examiner

*Primary Examiner* — Keith E Vicary (57) ABSTRACT

Embodiments herein provide for improved store-to-load-forwarding (STLF) logic and linear aliasing effect reduction logic. In one embodiment, a load instruction to be executed is selected. Whether a first linear address associated with said load instruction matches a linear address of a store instruction of a plurality of store instructions in a queue is determined. Data associated with said store instruction for executing said load instruction is forwarded, in response to determining that the first linear address matches the linear address of the store instruction.

20 Claims, 7 Drawing Sheets

UNIFIED STORE QUEUE FOR REDUCING LINEAR ALIASING EFFECTS

FIELD OF THE DISCLOSURE

This application relates generally to processing systems, and, more particularly, to organizing store queue entries in processing systems.

DESCRIPTION OF RELATED ART

Processors generally use memory operations to move data to and from memory. The term "memory operation" refers to an operation that specifies a transfer of data between a processor and memory (or cache). Load memory operations specify a transfer of data from memory to the processor, and store memory operations specify a transfer of data from the processor to memory.

Processing systems generally utilize two basic memory access instructions: a store instruction that writes information from a register to a memory location and a load instruction that reads information out of a memory location and loads the information into a register. Store and load instructions typically operate on memory locations in one or more caches associated with the processor. Values from store instructions are not committed to the memory system (e.g., the caches) immediately after execution of the store instruction. Instead, the store instructions, including the memory address and store data, are buffered in a store queue so they can be written in-order. Eventually, the store commits and the buffered data is written to the memory system. Buffering store instructions can be used to help reorder store instructions so that they can commit in order. However, buffering store instructions can introduce other complications. For example, a load instruction can read an old, out-of-date value from a memory address if a store instruction executes and buffers data for the same memory address in the store queue and the load attempts to read the memory value before the store instruction has retired.

A technique called store-to-load forwarding can provide data directly from the store queue to a requesting load. For example, the store queue can forward data from completed but not-yet-committed ("in-flight") store instructions to later (younger) load instructions. The store queue in this case functions as a Content-Addressable Memory (CAM) that can be searched using the memory address instead of a simple FIFO queue. When store-to-load forwarding is implemented, each load instruction searches the store queue for in-flight store instructions to the same address. The load instruction can obtain the requested data value from a matching store instruction that is logically earlier in program order (i.e. older). If there is no matching store instruction, the load instruction can access the memory system to obtain the requested value as long as any preceding matching store instructions have been retired and have committed their values to the memory.

Some state-of-the-art store queue allocation policies may result in delays that can degrade performance of the system. For example, a store instruction may need to wait until it is eligible to execute, is allocated a store entry that can hold data, and receives the data before performing store-to-load forwarding (STLF) to a load instruction with a matching address. Once the store entry has been allocated, the store instruction may be eligible to perform STLF of the received data to the matching load instruction. For another example, STLF may be delayed if a store instruction is waiting for the results of another operation, i.e., the store data is dependent upon another operation. The store instruction waits until the operation has completed and, once the operation has completed and the store instruction has received the results, the store instruction sends a wake-up signal to the load instruction so that STLF may be performed from the store instruction to the load instruction. Moreover, in conventional schemes using STLF, linear aliasing may occur, which refers to multiple linear addresses mapping to the same physical address. In this case, incorrect data may be forwarded during the storing process, leading to errors.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Some embodiments may include a method for reducing an effect of linear aliasing problems. A load for executing an instruction is selected. The load is associated with one of a plurality of stores in a queue. An order of a plurality of stores in the queue is determined based upon a pointer associated with the queue. At least a subset of a first linear address associated with the execution of the instruction is compared to corresponding subsets of linear addresses of the plurality of stores in the queue, based upon the pointer. The first linear address associated with the execution of the instruction is compared to a linear address of a matching store, in response to a determination that the subset of the first linear address matches the corresponding subset of the linear address of a matching store. A linear aliasing effect reduction process is performed in response to a determination that the full first linear address matches the linear address of the matching store. The data associated with the matching store is forwarded for executing the instruction in response to the comparing the first linear address, and the linear aliasing effect reduction process.

Some embodiments may include a method that include providing a first linear address to a unified store queue (USQ) comprising a plurality of stores, for executing an instruction and determining an order of a plurality of stores in the USQ based upon a pointer associated with the queue. The method also includes comparing at least a first subset of the first linear address to the corresponding linear addresses of a plurality of loads in the queue, based upon the pointer, for determining a matching store; comparing the first linear address to the linear address of the matching store to determine whether a full matching store is present, in response to a determination that the subset of the linear address matched the corresponding subset of the linear address of the matching store; comparing the physical address of the matching store to the physical addresses of a plurality of stores of the USQ to determine whether there is a physical address match in response to determining the full matching store is present; and comparing a second subset of the linear address of the matching store to a corresponding subset of a plurality of stores of the USQ to determine whether there is a linear address match. The method further includes determining that a linear alias is present in response to a determination that there is a physical address match and a linear address mismatch; and blocking data from the matching store from being used for executing the instruction in response to a determination that the linear alias is present.

Some embodiments provide an integrated circuit that includes a processor for executing an instruction. The processor comprises a queue unit configured to: receive a linear address for executing the instruction; compare at least a subset of a first linear address associated with the instruction to corresponding subsets of linear addresses of a plurality of stores to determine whether a matching store is present; compare the full first linear address associated with the instruction to corresponding full linear addresses the matching store in response to a determination that the subset of the first linear address matches the corresponding subset of the linear address of at least one other store of the plurality; and perform a linear aliasing effect reduction process in response to a determination that the full first linear address matches the linear address of the matching load, wherein the linear aliasing effect reduction process comprises comparing the physical address of the matching store to the physical addresses of a plurality of stores to determine whether there is a physical location match, comparing a second subset of a plurality of stores of the queue to determine whether there is a second subset mismatch, and blocking forwarding of the load associated with the matching store in response to the presence of a physical location match and the mismatch.

Some embodiments provide an integrated circuit that includes a processor for executing an instruction; a unified store queue (USQ) unit for providing at least one pointer for a plurality of stores; and a store to load forward (STLF) logic. The STLF logic is configured to receive a linear address for executing the instruction; compare at least a first subset of a linear address associated with the instruction to corresponding first subsets of linear addresses of a plurality of stores in the USQ to locate a matching store; compare the full linear address to the full linear address of the matching store; and perform a linear aliasing reduction process in response to a determination that the full linear address matches the linear address of the matching store.

Some embodiments provide a non-transitory computer-readable medium storing instructions executable by at least one processor for to fabricating an integrated circuit device. The integrated circuit device is capable of reducing an effect of linear aliasing problems. The integrated circuit device includes a processor for executing an instruction; a unified store queue (USQ) unit for providing at least one pointer for a plurality of stores; and a store to load forward (STLF) logic. The STLF logic is configured to receive a linear address for executing the instruction; compare at least a first subset of a linear address associated with the instruction to corresponding first subsets of linear addresses of a plurality of stores in the USQ to locate a matching store; compare the full linear address to the full linear address of the matching store; and perform a linear aliasing reduction process in response to a determination that the full linear address matches the linear address of the matching store.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter may be modified and may take alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It should be appreciated that in the development of any such actual embodiment, numerous implementation-specific decisions should be made, which may vary from one implementation to another. Moreover, it should be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions. The word "exemplary" is intended to serve as one example and not to limit the application by construing the example or embodiment as preferred or advantageous over other embodiments.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, conventional store queue operations can lead to substantial delays in performing operations such as STLF. Moreover, the conventional store queue operations may lead to linear aliasing. The present application therefore describes embodiments of a unified store queue that allows for operations such as STLF, while reducing linear aliasing problems.

Figure 1:
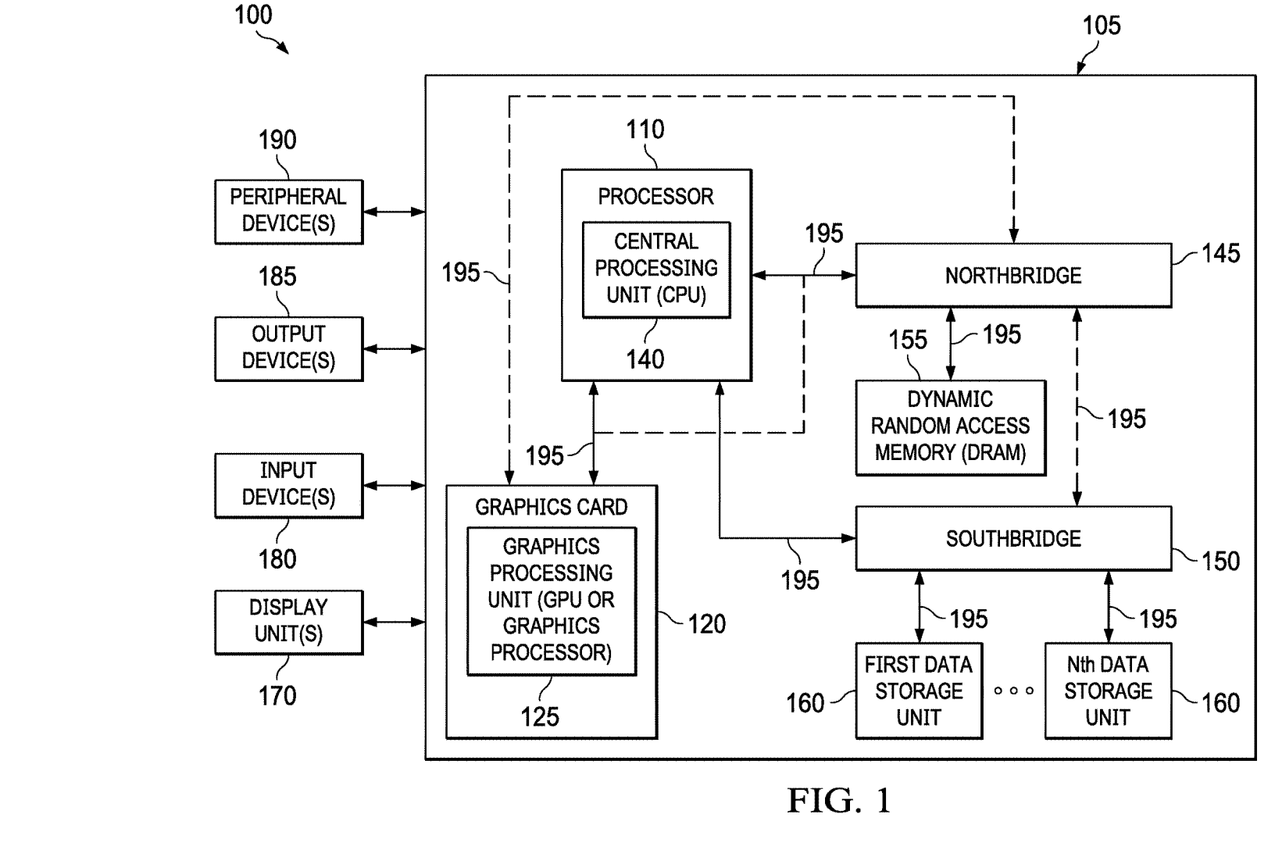
FIG. 1 conceptually illustrates a computer system, according to some embodiments.

FIG. 1 conceptually illustrates a computer system 100, according to some embodiments. The computer system 100 may be a personal computer, a laptop computer, a handheld computer, a netbook computer, a mobile device, a tablet computer, a netbook, an ultrabook, a telephone, a personal data assistant (PDA), a server, a mainframe, a work terminal, a smart television, or the like. The computer system includes a main structure 105 which may be a computer motherboard, system-on-a-chip, circuit board or printed circuit board, a desktop computer enclosure or tower, a laptop computer base, a server enclosure, part of a mobile device, tablet, personal data assistant (PDA), or the like. The computer system 100 may run an operating system such as Linux®, Unix®, Windows®, Mac OS®, or the like.

In some embodiments, the main structure 105 includes a graphics card 120. For example, the graphics card 120 may be an ATI Radeon™ graphics card from Advanced Micro Devices ("AMD"). The graphics card 120 may, in different embodiments, be connected to a Peripheral Component Interconnect (PCI) Bus (not shown), PCI-Express Bus (not shown), an Accelerated Graphics Port (AGP) Bus (also not shown), or other electronic or communicative connection. The graphics card 120 may include a graphics processing unit (GPU) 125 used in processing graphics data. The graphics card 120 may be referred to as a circuit board or a printed circuit board or a daughter card or the like.

The computer system 100 may comprise a processor 110, in accordance with some embodiments, is illustrated. Modern computer systems may exist in a variety of forms, such as telephones, tablet computers, desktop computers, laptop computers, servers, smart televisions, or other consumer electronic devices. The processor unit 110 may comprise one or more central processing units (CPUs) 140. The CPU 140 is capable of performing memory operations using the unified store queue taught herein.

The CPU(s) 140 may be electronically or communicatively coupled to a northbridge 145. The CPU 140 and northbridge 145 may be housed on the motherboard (not shown) or some other structure of the computer system 100. In some embodiments, the graphics card 120 may be coupled to the CPU 140 via the northbridge 145 or some other electronic or communicative connection. For example, CPU 140, northbridge 145, GPU 125 may be included in a single package or as part of a single die or "chip". The northbridge 145 may be coupled to a system RAM (or DRAM) 155 or the system RAM 155 may be coupled directly to the CPU 140. The system RAM 155 may be of any RAM type known in the art; the type of system RAM 155 may be a matter of design choice. The northbridge 145 may be connected to a southbridge 150. The northbridge 145 and southbridge 150 may be on the same chip in the computer system 100, or the northbridge 145 and southbridge 150 may be on different chips. The southbridge 150 may be connected to one or more data storage units 160. The data storage units 160 may be hard drives, solid state drives, magnetic tape, or any other non-transitory, writable media used for storing data. In various embodiments, the CPU 140, northbridge 145, southbridge 150, GPU 125, or system RAM 155 may be a computer chip or a silicon-based computer chip, or may be part of a computer chip or a silicon-based computer chip. The various components of the computer system 100 may be operatively, electrically, or physically connected or linked with a bus 195 or more than one bus 195. Some embodiments of the buses 195 may be result buses that are used to convey results of operations performed by one functional entity in the computer system 100 to another functional entity in the computer system 100.

The computer system 100 may be connected to one or more display units 170, input devices 180, output devices 185, or peripheral devices 190. These elements may be internal or external to the computer system 100, and may be wired or wirelessly connected. The display units 170 may be internal or external monitors, television screens, handheld device displays, touchscreens, and the like. The input devices 180 may be any one of a keyboard, mouse, trackball, stylus, mouse pad, mouse button, joystick, touchscreen, scanner or the like. The output devices 185 may be any one of a monitor, printer, plotter, copier, or other output device. The peripheral devices 190 may be any other device that can be coupled to a computer. Example peripheral devices 190 may include a CD/DVD drive capable of reading or writing to physical digital media, a USB device, Zip Drive, external hard drive, phone or broadband modem, router/gateway, access point or the like.

The GPU 125 and the CPU 140 may implement various functional entities including one or more processor cores, floating-point units, arithmetic logic units, load store units, translation lookaside buffers, instruction pickers, or caches such as L1, L2, or L3 level caches in a cache hierarchy.

Figure 2:
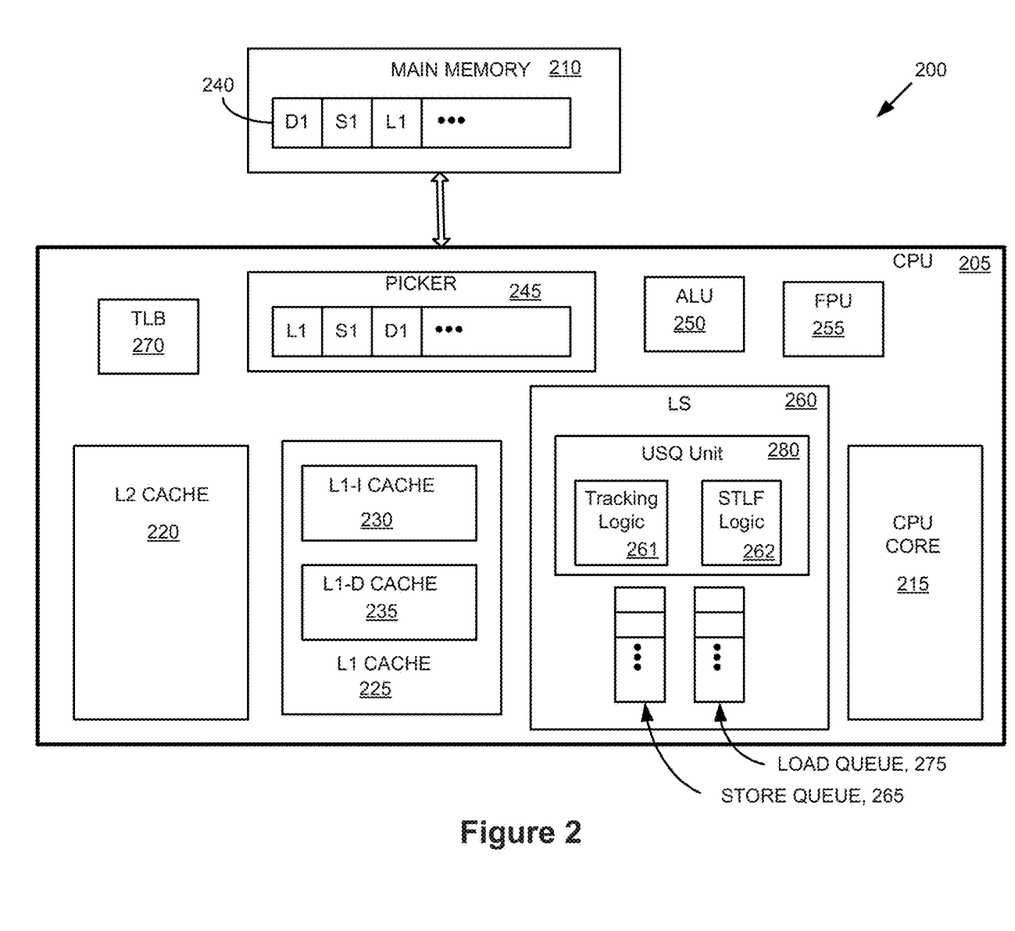
FIG. 2 provides a representation of a CPU, depicted in FIG. 1, in accordance with some embodiments.

FIG. 2 conceptually illustrates an example of a semiconductor device 200 that may be formed in or on a semiconductor wafer (or die), according to some embodiments. The semiconductor device 200 may be formed in or on the semiconductor wafer using well known processes such as deposition, growth, photolithography, etching, planarizing, polishing, annealing, and the like. Some embodiments of the device 200 include a central processing unit (CPU) 205 that is configured to access instructions or data that are stored in the main memory 210. Some embodiments of the CPU 205 may be implemented as part of the CPU 140 shown in FIG. 1, the GPU 125 shown in FIG. 1, or other processing elements.

The CPU 205 includes one or more CPU cores 215 that are used to execute the instructions or manipulate data. The CPU 205 also implements a hierarchical (or multilevel) cache system that is used to speed access to the instructions or data by storing selected instructions or data in the caches. However, persons of ordinary skill in the art having benefit of the present disclosure should appreciate that some embodiments of the device 200 may implement different configurations of the CPU 205, such as configurations that use external caches. Some embodiments may implement different types of processors such as graphics processing units (GPUs) or accelerated processing units (APUs) and some embodiments may be implemented in processing devices that include multiple processing units or processor cores.

The cache system shown in FIG. 2 includes a level 2 (L2) cache 220 for storing copies of instructions or data that are stored in the main memory 210. Relative to the main memory 210, the L2 cache 220 may be implemented using faster memory elements and may have lower latency. The cache system shown in FIG. 2 also includes an L1 cache 225 for storing copies of instructions or data that are stored in the main memory 210 or the L2 cache 220. Relative to the L2 cache 220, the L1 cache 225 may be implemented using faster memory elements so that information stored in the lines of the L1 cache 225 can be retrieved quickly by the CPU 205. Some embodiments of the L1 cache 225 are separated into different level 1 (L1) caches for storing instructions and data, which are referred to as the L1-I cache 230 and the L1-D cache 235. Persons of ordinary skill in the art having benefit of the present disclosure should appreciate that the cache system shown in FIG. 2 is one example of a multi-level hierarchical cache memory system and some embodiments may use different multilevel caches including elements such as L0 caches, L1 caches, L2 caches, L3 caches, and the like.

The CPU core 215 can execute programs that are formed using instructions such as load instructions and store instructions. Some embodiments of programs are stored in the main memory 210 and the instructions are kept in program order, which indicates the logical order for execution of the instructions so that the program operates correctly. For example, the main memory 210 may store instructions for a program 240 that includes the store S1, the load L1, and another instruction D1 that may provide data to the store S1 in program order. Instructions that occur earlier in program order are referred to as "older" instructions and instructions that occur later in program order are referred to as "younger" instructions. Persons of ordinary skill in the art having benefit of the present disclosure should appreciate that the program 240 may also include other instructions that may be performed earlier or later in the program order of the program 240.

Some embodiments of the CPU 205 are out-of-order processors that can execute instructions in an order that differs from the program order of the instructions in the program 240. The instructions may therefore be decoded and dispatched in program order and then issued out-of-order. As used herein, the term "dispatch" refers to sending a decoded instruction to the appropriate unit for execution and the term "issue" refers to executing the instruction. The CPU 205 includes a picker 245 that is used to pick instructions for the program 240 to be executed by the CPU core 215. For example, the picker 245 may select instructions from the program 240 in the order L1, S1, D1, which differs from the program order of the program 240 because the younger load L1 is picked before the older store S1, which is picked before the older instruction D1.

Some embodiments of the CPU 205 implement an arithmetic logic unit (ALU) 250 that is used to perform arithmetic or logical operations. For example, the ALU 250 may receive input from one or more registers in the CPU 205 and may be controlled to perform one or more arithmetic or logical operations on the input and then write the results to one or more output registers in the CPU 205. Some embodiments of the ALU 250 may be used to perform operations indicated by instructions (such as the instruction D1) and the results may be provided to a store instruction (such as the store instruction S1) for subsequent writing to one or more of the caches 220, 225, 230, 235. Some embodiments of the CPU 205 may implement a floating-point unit (FPU) 255 to perform operations such as addition, subtraction, multiplication, division, and square root, or transcendental functions on floating point numbers. Some embodiments of the ALU 250 may be used to perform operations indicated by instructions (such as the instruction D1) and the results may be provided to a store instruction (such as the store instruction S1) for subsequent writing to one or more of the caches 220, 225, 230, 235. Some embodiments of the CPU 205 may include buses (such as the buses 195 shown in FIG. 1) for conveying results of operations between entities within the CPU 205.

The CPU 205 may implement a unified store queue (USQ) unit 280 capable of performing store operations. A load-store unit (LS) 260 may comprise a USQ unit 280 and one or more store queues 265 that are used to hold the store instructions and associated data. The data location for each store instruction is indicated by a virtual address, which may be translated into a physical address so that data can be accessed from the main memory 210 or one of the caches 220, 225, 230, 235. The CPU 205 may therefore include a translation look aside buffer (TLB) 270 that is used to translate virtual addresses into physical addresses. The store instruction may be placed in the store queue 265 to wait for data upon dispatch. Entries in the store queue 265 may therefore be allocated prior to the store instruction (such as S1) receiving a valid address translation from the TLB 270 or becoming eligible for execution. Entries in the store queue 265 include storage space for the data that is to be written to the physical address by the corresponding store instruction. Consequently, entries corresponding to the store instruction are able to receive data upon dispatch and prior to receiving an address translation.

The USQ unit 280 may include a tracking logic 261 and an STLF logic 262. The tracking logic 261 may comprise a dispatch pointer, which indicates where in the store queue new stores (in this context, store instructions with basic information relating thereto, e.g., ROB tag and source register, among others) should be inserted. (The address and data for a new store may, but need not, be known when queuing the new store). The tracking logic 261 may also comprise a head pointer, which may indicate the oldest store, which is the next one to perform the write operation into memory, i.e., the next one to commit. The tracking logic 261 may also comprise a non-speculative pointer, which is capable of tracking which set of stores are speculative, which stores are not speculative. As used herein, a speculative state associated with a memory location may refer to state of the memory location subsequent to the execution of one or more speculative store memory operations. A particular instruction may be speculative if one or more branch instructions prior to the particular instruction in the program order have not yet been executed, or if the instruction has not yet been retired. "Retired" refers to a store instruction that has not yet reached the head of the ROB, or if it has reached the head of the ROB, attendant logic has not yet decided to retire it. "Retirement" here is distinct from "commitment." Retired instructions are considered complete to software, whereas committed instructions are retired ones which have been written into cache. The non-speculative pointer may point to somewhere in between the dispatch pointer and the head pointer (see FIG. 3A). The non-speculative pointer may indicate the point that the store instruction has been retired and/or that all branch instructions prior to it in program order have been executed. The non-speculative pointer may indicate the point that delineates pre-retired and post-retired (i.e., retired but not yet committed) store instructions. This is useful for branch mispredict rollback. When a branch mispredict occurs, the non-retired stores are flushed out, and the retired stores are kept intact.

The dispatch pointer, the head pointer, and the non-speculative pointer each may be accompanied with a wrap bit that helps indicate when the pointers wrap back to the beginning of the queue. This may reveal where the oldest entries are located. If a branch mispredict occurs, the dispatch pointer may become reset to the non-speculative pointer, which other pointers remain the same.

Figure 3A:
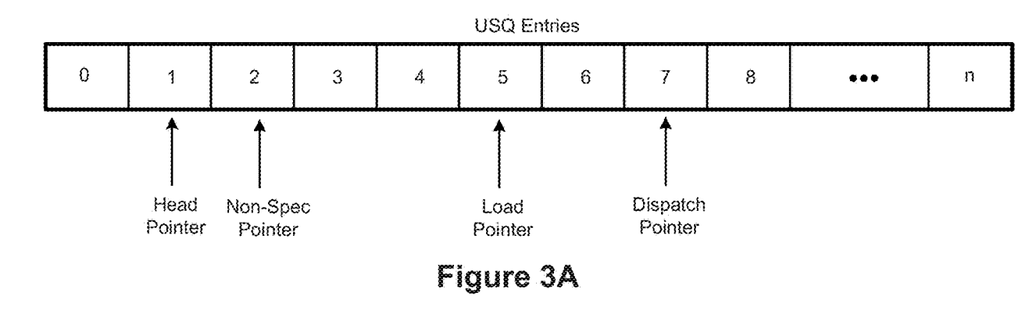
FIG. 3A conceptually illustrates an example of unified store queue entries, according to some embodiments.

FIG. 3A illustrates a stylized, exemplary set of USQ entries. In the example of FIG. 3A, the head pointer is pointing to entry location 1, while the non-speculative pointer is pointing to entry location 2. The load pointer, which indicates where in the USQ new load instructions should be retrieved and is dependent on the specific load instruction currently executing, is pointing to entry location 5, and the dispatch pointer is pointing to entry location 7. In the example of FIG. 3A, stores in location 1 through location 6 are valid, that is, no new stores would be stored in those locations. The store in location 1 is the oldest store, as well as the only retired store, i.e., the store(s) between the head pointer and the non-speculative pointer. The stores in location 1 through location 4 are older than the entry in the USQ pointed to by the load pointer, and the store in location 6 is younger than the entry in the USQ pointed to by the load pointer.

Turning back to FIG. 2, the USQ unit 280 also comprises an STLF logic 262. The STLF logic 262, in one embodiment, provides for a store to load forwarding (STLF) process that takes into account linear addressing. Upon execution of a load instruction, a target load instruction is selected. The target load instruction includes basic information relating thereto, and at least the linear address. If the selected load linear address matches an older store, data from that store is forwarded to the load, thereby allowing for completing the load earlier than otherwise. When a load is selected for an operation, the corresponding linear address is received by the USQ unit 280. The USQ unit 280 performs a search for all stores that would match a subset of their address bits (e.g., the lower order bits 15:0). The USQ unit 280 may then perform a ranking function that would prioritize the stores according to age.

In order to perform the store operation, the USQ unit 280 may select the youngest older store that matches the load and prepares the corresponding data for forwarding. In one embodiment, a multiplexer is used to forward the data associated with the load. Subsequently, the USQ unit 280 may compare the full linear address (e.g., bits 47:0) of the store to the load. If the full linear address of the store does not fully match the load, the USQ unit 280 may cancel the forwarding process.

In some cases, utilization of linear addressing may result in linear aliasing. Linear aliasing may refer to a plurality of linear addresses mapping to the same physical addresses. The stores in the USQ unit 280 in the LS 260 may have distinct linear addresses, but in some cases, a plurality of stores may map to the same physical location. Therefore, in this case, there is a danger in forwarding the incorrect data for a particular operation.

Some embodiments provide for accounting for linear aliasing. During execution of a store operation, a new store in the USQ unit 280 may receive a physical address. The physical address is checked against all older stores in the USQ unit 280. Any older stores that match the physical address of the new store, but mismatch a predetermined subset of linear address bits (e.g., bits 15:12) of the new store, are tagged with a "poisoned" status. Some embodiments may employ comparators (physical, firmware, and/or virtual) for comparing against the physical addresses. Some embodiments provide for the stores to comprise "poisoned" bits that are asserted to indicate a poisoned status. Upon tagging a store as having a poisoned status, that particular store would be prevented from participating in a subsequent STLF process. In this manner, a full comparator on the linear address is not needed for performing the physical address comparisons. Further, this process may reduce the possibility of forwarding the incorrect data for a particular operation.

Embodiments herein provide for employing an STLF scheme in conjunction with linear aliasing error reduction processes described herein. Therefore, utilizing embodiments herein, instead of the processor 110 having to shift queues in the LS 260, pointers are used for more efficient memory transactions. The linear alias effect reduction scheme (or linear alias poisoning scheme) utilized in conjunction to the USQ and STLF process described herein provide for more efficient design, for example, because this approach does not require a full linear and physical CAM. Some embodiments here avoid the use of pipeline flushes to correct erroneous STLF processes, but instead block (or stall execution of) the load to reduce the possibility of erroneous information being used for memory operations. Utilizing the LS 280 embodiment describe herein, power consumption reduction may be achieved, and further, organizing the stores using the USQ Unit 280, a more centralized approach for handling stores using in-order queues described herein may provide for a more simplified and efficient design.

Figure 3B:
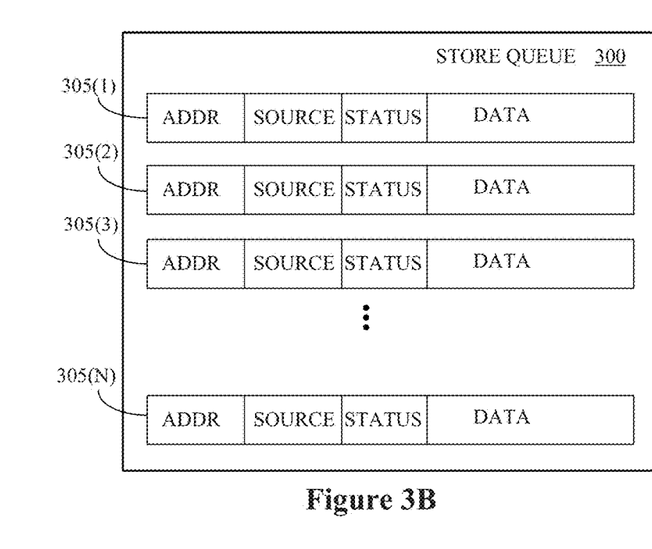
FIG. 3B conceptually illustrates one example of a store queue such as the store queue shown in FIG. 2, according to some embodiments.

FIG. 3B conceptually illustrates one example of a store queue 300 such as the store queue 265 shown in FIG. 2, according to some embodiments. The store queue 300 is configured to store entries 305 associated with store instructions. The entries 305 include an address field (ADDR) that includes information indicating an address of a location for storing data associated with the store instruction, such as a virtual address or, if the store instruction has received an address translation, a physical address in a memory page. The entries 305 also include space for holding data (DATA) that is to be written to the address indicated in the address field upon execution of the corresponding store instruction. Although the DATA space is allocated to each entry 305 when the entry is allocated to a store instruction, data may not be initially stored in the DATA space. For example, the store instruction may be awaiting data from an in-flight operation, as discussed herein.

Some embodiments of the entry 305 in the store queue 300 are configured to store information indicating the source (SOURCE) of the data that is going to be written to the address indicated in the address field. For example, the source of the data may be a fixed or predetermined value (like 0) or the data may be provided by a register file or an in-flight operation. Since the entry 305 includes space for holding the data, the data may be written into the entry as soon as it is available. For example, fixed values may be entered into the DATA field immediately upon allocation of the entry 305. Some embodiments of the store queue 300 may have one or more connections to one or more register files so that entries 305 can access the data in the register files and write this information into the DATA field as soon as the data is available in the register file. Data generated by an in-flight operation may be written to the DATA field when execution of the in-flight operation completes. For example, the store queue 300 may snoop result buses and obtain data when it sees an operation complete and assert the result on the result bus. Some embodiments of the store queue 300 may use the same storage elements for the SOURCE and DATA fields. For example, storage elements associated with the DATA field may store information indicating where the data is coming from (e.g., SOURCE information) and this information may be replaced with the actual data when the data arrives. The entry 305 may also include one or more status bits, as indicated in FIG. 3B. The status bits may provide for information, such as "poisoned" stores, etc.

Some embodiments of the entries 305 may be configured to store information that indicates the relative age of the entries 305. For example, the relative age of the entry 305 may be indicated by a pointer that points to the next youngest or oldest entry 305, timestamps or counters that indicate the relative ages of the entries 305, or by storing the entries 305 in an order that indicates their relative ages.

Referring back to FIG. 2, one or more load queues 275 are implemented in the load-store unit 260 shown in FIG. 2. Load data may be indicated by virtual addresses and so the virtual addresses for load data may be translated into a physical address by the TLB 270. A load instruction (such as L1) may be added to the load queue 275 on dispatch or when the load instruction is picked and receives a valid address translation from the TLB 270. Either the virtual or physical address of the load instruction may be used to check the store queue 265 for address matches. If an address (virtual or physical depending on the embodiment) in the store queue 265 matches the address of the data used by the load instruction, then store-to-load forwarding may be used to forward the data from the store queue 265 to the load instruction in the load queue 275.

Entries in the store queue 265 may be eligible to initiate STLF as soon as they have been allocated to a store instruction and received an address, even though the corresponding store instruction may not have received the data that is to be forwarded. For example, the load store unit 260 may use indications that a source of the data is in the process of generating the data for the entry in the store queue 265 and timing information associated with the source, the store queue 265, or the load queue 275 to provide a wake-up signal from the store queue 265 to the load queue 275. For example, the results of an operation (such as the instruction D1) performed by the ALU 250 or the FPU 255 may be provided to an entry in the store queue 265 (e.g., an entry corresponding to the store instruction S1) and subsequently forwarded to an entry in the load queue 275 such as an entry corresponding to the load instruction L1. A wake-up signal may therefore be provided from the store queue 265 to the load queue 275 in response to the operation being scheduled for execution. The load queue 275 may use the wake-up signal to schedule execution of the load instruction. Scheduling of the load instruction may be timed so that the data is available for forwarding from the store queue 265 when needed by the load instruction. Some embodiments of the system may include separate buses for carrying the result data and scheduling information between the ALU 250, the FPU 255, the store queue 265, and the load queue 275.

Figure 4:
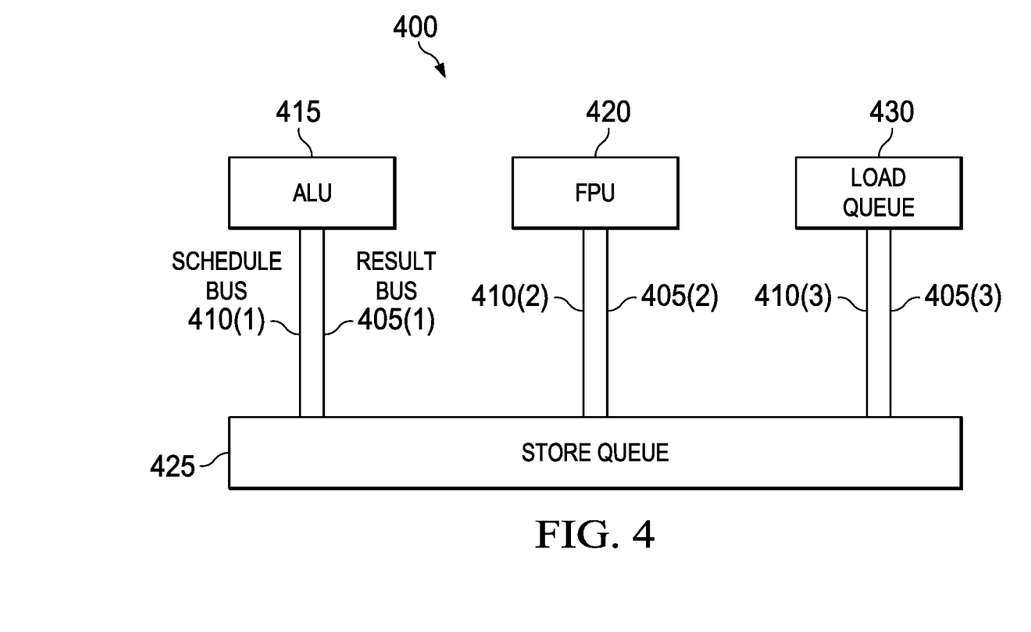
FIG. 4 conceptually illustrates an example of a computer system that includes result buses and scheduling buses, according to some embodiments.

FIG. 4 conceptually illustrates an example of a computer system 400 that includes result buses 405 and scheduling buses 410, according to some embodiments. The result buses 405 and the scheduling buses 410 shown in FIG. 4 may be used to convey result data or scheduling information, respectively, between elements in the computer system 400 such as an ALU 415, an FPU 420, a store queue 425, or a load queue 430. Embodiments of the ALU 415, the FPU 420, the store queue 425, or the load queue 430 may be implemented in some embodiments of the device 200 depicted in FIG. 2. In some embodiments, the store queue 425 may be part of the USQ unit 280, and in other embodiments, the store queue 425 may be separate from the USQ unit 280. The store queue 425 can monitor the schedule buses 410 to determine when operations associated with store instructions in the store queue 425 have been scheduled for operation. The store queue 425 can then initiate the wake-up process for STLF in response to detecting a signal indicating that an associated operation has been scheduled. For example, the ALU 415 or the FPU 420 may provide a signal to the schedule buses 410(1-2) in response to scheduling execution of operations. For another example, the load queue 430 may provide a signal to the schedule bus 410(3) when a load instruction is scheduled to be executed.

The store queue 425 may detect signals on one of the schedule buses 410 and may provide a wake-up signal to the load queue 430 if the signal on one or more of the schedule buses 410 indicates scheduling of an operation or load instruction that provides results that are used by a store instruction that is eligible for STLF. The load queue 430 may receive the wake-up signal and respond to the wake-up signal by scheduling execution of the load instruction, as discussed herein. Once the operation or instruction has completed execution, the ALU 415, FPU 420, or load queue 430 can provide results of the operation to the result buses 405. The store queue 425 may read the results from the result buses 405 and store them in the corresponding entry. Data from the entry in the store queue 425 may then be forwarded to the load queue 430 using STLF.

Figure 5:
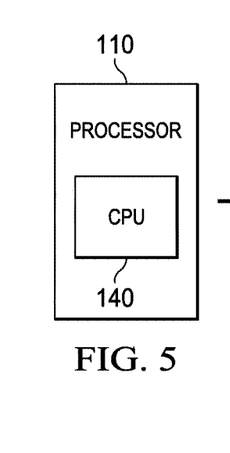
FIG. 5 provides a representation of a processor depicted in FIG. 1, in accordance with some embodiments.
Figure 6A:
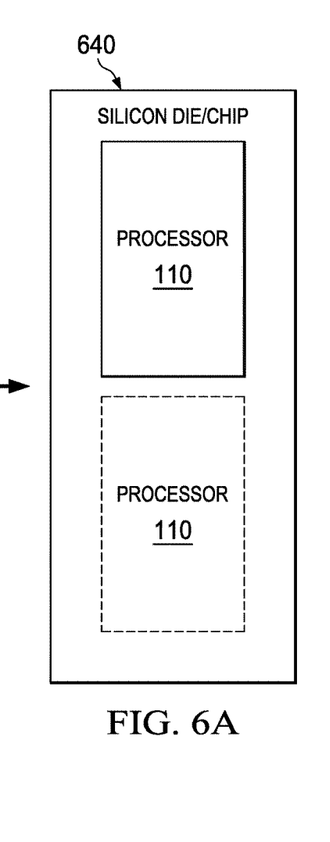
FIG. 6A provides a representation of a silicon die/chip that includes one or more circuits as shown in FIG. 3, in accordance with some embodiments.

Turning now to FIG. 5 and FIG. 6A, in some embodiments, the processor 110 comprising a CPU 140 may reside on a silicon die/chip 640. The silicon die/chip 640 may be housed on a motherboard or other structure of the computer system 100. In some embodiments, there may be more than one processor 110 on each silicon die/chip 640. Some embodiments of the processor 110 may be used in a wide variety of electronic devices.

Figure 6B:
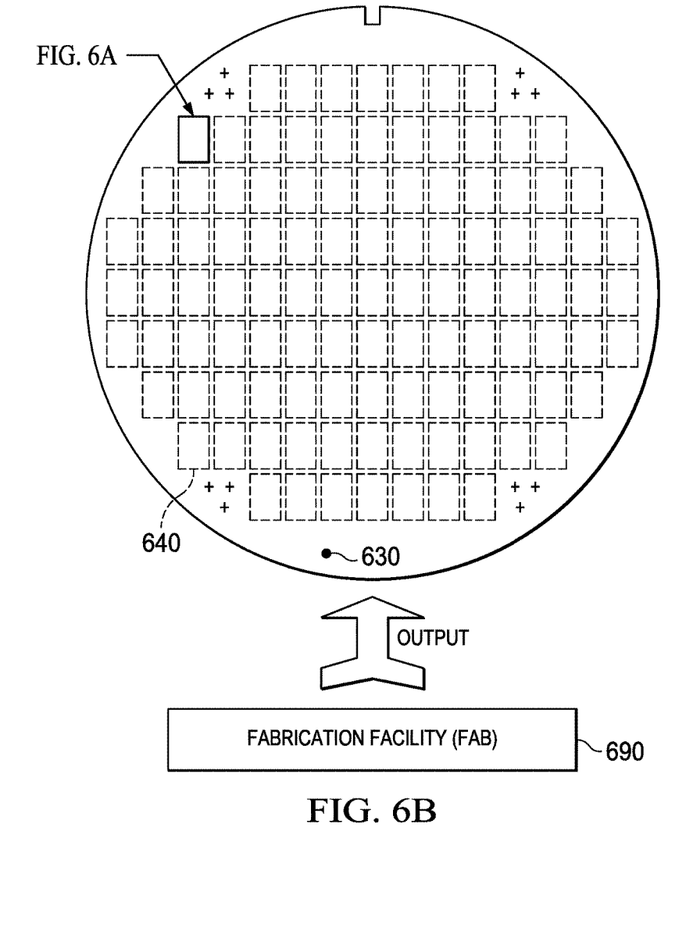
FIG. 6B provides a representation of a silicon wafer which includes one or more dies/chips that may be produced in a fabrication facility, in accordance with some embodiments.

Turning now to FIG. 6B, in accordance with some embodiments, and as described above, the processor 110 may be included on the silicon chip/die 640. The silicon chip/die 640 may contain one or more different configurations of the processor 110. The silicon chip/die 640 may be produced on a silicon wafer 630 in a fabrication facility (or "fab") 690. That is, the silicon wafer 630 and the silicon die/chip 640 may be referred to as the output, or product of, the fab 690. The silicon chip/die may be used in electronic devices.

The circuits described herein may be formed on a semiconductor material by any known means in the art. Forming may be done, for example, by growing or deposition, or by any other means known in the art. Different kinds of hardware descriptive languages (HDL) may be used in the process of designing and manufacturing the microcircuit devices. Examples include VHDL and Verilog/Verilog-XL. In some embodiments, the HDL code (e.g., register transfer level (RTL) code/data) may be used to generate GDS data, GDSII data and the like. GDSII data, for example, is a descriptive file format and may be used in some embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units, RAMs, compact discs, DVDs, solid state storage and the like) and, in some embodiments, may be used to configure a manufacturing facility (e.g., through the use of mask works) to create devices capable of embodying various aspects of some embodiments. As understood by one or ordinary skill in the art, this data may be programmed into a computer, processor, or controller, which may then control, in whole or part, the operation of a semiconductor manufacturing facility (or fab) to create semiconductor products and devices. In other words, some embodiments relate to a non-transitory computer-readable medium storing instructions executable by at least one processor to fabricate an integrated circuit. These tools may be used to construct the embodiments described herein.

Figure 7:
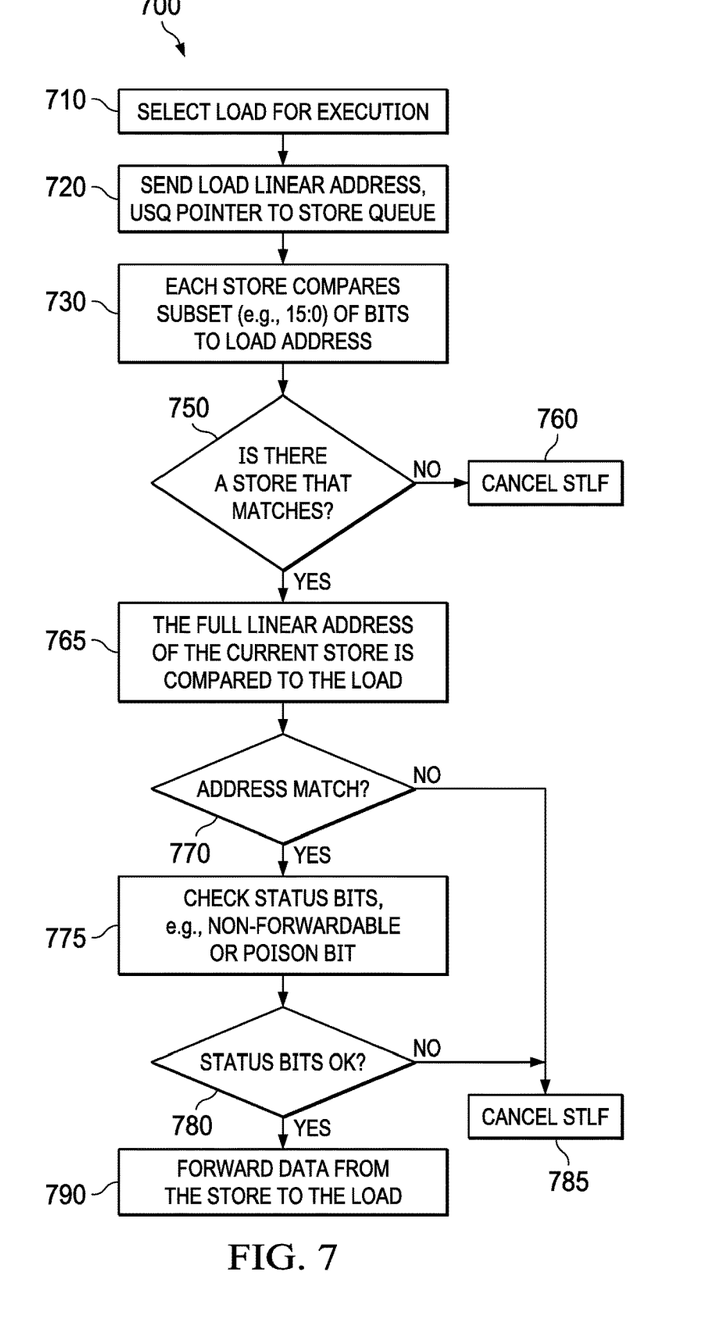
FIG. 7 is a flowchart of a method relating to a store operation, in accordance with some embodiments.

Turning now to FIG. 7, a flowchart of a method 700 relating to an STLF procedure, in accordance with some embodiments, is illustrated. The CPU 140 may select (at 710) a load instruction to be executed. Various information, such as load linear address, the USQ pointer information, etc. is sent (at 720) to the store queue 265. Each store instruction in the store queue then compares at least a subset of its linear address bits (e.g., 15:0) to the linear address of the load instruction (at 730). A determination is made whether there exists a store instruction having a linear address that substantially matches the linear address (at 750). If a determination is made that no store instruction substantially matches the subset of the linear address, the STLF procedure may then be canceled (at 760) for the current operation.

If a determination is made that a store instruction fully matches the subset of the linear address (at 750), the full linear address of that store instruction is compared to that of the load instruction (at 765). If a determination is made that the full linear address does not match (at 770) that of the current store instruction, the STLF procedure is canceled (at 785). However, if a determination is made that the linear address substantially matches (at 770) that of the current store instruction, the status bit(s) (e.g., the non-forwardable or poison bit) may be checked (at 775). A determination is made whether the status bit(s) are not indicating a linear alias or partial linear address mismatch with the store instruction (e.g., the non-forwardable bit and/or the poisoned bit is not set) (at 780). In some embodiments, other status bits may be checked also, in order to make a final STLF determination. If there is a linear alias and/or partial linear address mismatch with the store instruction indicated by at least one of the status bits, the STLF process is canceled for the current operation (at 785). If the status bits show no problems, then the data from the store is forwarded to the load (at 790).

Figure 8:
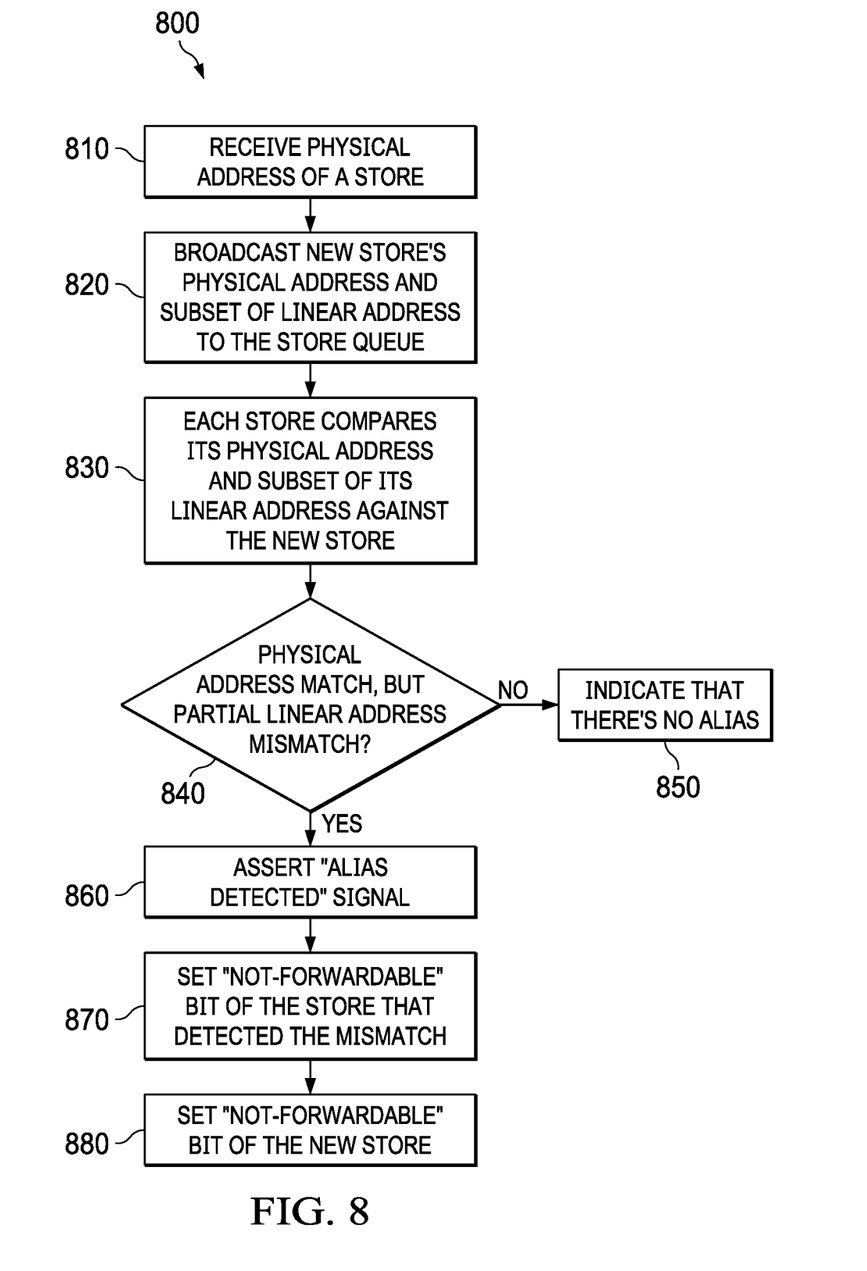
FIG. 8 is a flowchart a method relating to a linear alias reduction process, in accordance with some embodiments.

Turning now to FIG. 8, a flowchart of a method 800 relating to a store operation for reducing or solving a linear aliasing effect, in accordance with some embodiments, is illustrated. Implementation of the linear addressing process described herein may result in linear aliasing. Linear aliasing generally refers to multiple linear addresses that map to the same physical address. As a result, errors can occur when forwarding data to a load because incorrect data may be forwarded for an operation. Some embodiments herein provide for reducing linear aliasing. During execution of a store operation, a new store in the USQ unit 280 may receive a physical address (at 810). The physical address may be received from a translation look-aside buffer (TLB), a table in the processor's 110 memory that contains information about pages in memory. The new store's physical address as well as a subset of the linear address (e.g. bits 15:12) are broadcast (at 820) to the store queue 265 of the LS 260 for comparison.

As a result of the broadcast of block 820, for each store in the store queue 265, the method 800 may compare (at 830) its physical address and a subset of its linear address to the corresponding physical address and linear address subset of the new store. A determination is made whether there is a physical address match and a partial linear address (e.g., bits 15:12) match (at 840). If there is a physical address match, but no partial linear address (e.g., bits 15:12) mismatch, an indication is provided (at 850) that there is no linear aliasing effect as a result of the current operation. Further, if there is physical address mismatch, it is an indication that there is no linear alias effect as a result of the current operation.

Upon a determination that there is a physical address match and a linear address subset (e.g., bits 15:12) mismatch, a signal indicating that a linear alias has been detected is asserted (at 860). Some embodiments provide for a "poisoned" status bit to set, indicating that a linear alias has been detected. Some embodiments provide for asserting (at 870) a "not-forwardable" status bit of the store in the store queue to indicate that the physical address matches and the partial linear address mismatches the new store. Moreover, the "not-forwardable" status bit of the new store is also set (at 880), thereby reducing the possibility of an error caused by linear aliasing.

Embodiments herein provide for employing an STLF scheme in conjunction with linear aliasing error reduction processes described herein. Utilizing the LS 260 embodiment described herein, power consumption reduction may be achieved, and further, organizing the stores using the USQ Unit 280, a more centralized approach for handling stores using in-order queues described herein provide for a more simplified and efficient process.

Embodiments of processor systems that can allocate a store queue entries to store instructions for the USQ and STLF processes described herein (such as the processor system 100) may be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

Furthermore, the methods disclosed herein may be governed by instructions that are stored in a non-transitory computer readable storage medium and that are executed by at least one processor of a computer system. Each of the operations of the methods may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   selecting a load instruction for execution;
   determining whether a full linear address of the load instruction matches a full linear address of one store instruction of a plurality of store instructions in a store queue;
   responsive to determining an address match between the full linear address of the load instruction and the full linear address of one store instruction of the plurality of store instructions, checking whether one or more status bits of the one store instruction are set, wherein the one or more status bits are set upon a determination of a physical address match and a partial linear address mismatch between the one store instruction and a second store instruction of the plurality of store instructions; and
   forwarding, in response to determining that the one or more status bits of the one store instruction are not set, data associated with the one store instruction of the plurality of store instructions to complete execution of the load instruction.

2. The method of claim 1, further comprising:
   preventing the forwarding of data in response to determining that no address match exists between the full linear address of the load instruction and the plurality of store instructions.

3. The method of claim 2, further comprising:
   blocking data associated with the one store instruction from being forwarded to the load instruction, in response to determining that the one or more status bits of the one store instruction are set.

4. The method of claim 3, wherein the one or more status bits indicate at least one of a linear alias or a partial linear address mismatch with a store instruction.

5. The method of claim 2, wherein determining whether the full linear address of the load instruction matches the full linear address of the one store instruction is in response to a determination that a subset of the full linear address of the one store instruction matches a subset of the full linear address of the load instruction.

6. The method of claim 5, further comprising:
   comparing the subset of the full linear address of the load instruction to a subset of a full linear address of each store instruction of the plurality of store instructions to determine whether a match exists; and
   canceling forwarding of data associated with the one store instruction to a corresponding load instruction responsive to a determination that no match exists.

7. A method, comprising
   broadcasting a physical address and a subset of a linear address of a new store instruction to a store queue comprising a plurality of store instructions;
   comparing a physical address and a subset of a linear address of each store instruction of the plurality of store instructions in the store queue to the physical address and the subset of the linear address of the new store instruction;
   asserting a signal in the store queue indicating detection of a linear alias, in response to the physical address of the new store instruction matching the physical address of one store instruction of the plurality of store instructions in the store queue, and the subset of the linear address of the new store instruction not matching the subset of the linear address of the one store instruction, wherein asserting the signal comprises asserting a status bit indicating a poisoned status; and
   preventing forwarding of data from the one store instruction in response to the asserted status bit.

8. The method of claim 7, wherein broadcasting the subset of the linear address of the new store instruction comprises broadcasting address bits 15:12.

9. The method of claim 7, further comprising indicating that the linear alias is not present in response to a determination that the physical address of the new store instruction fails to match the physical address of the one store instruction.

10. A method, comprising:
providing a first linear address of a load instruction for execution to a unified store queue (USQ) comprising a plurality of store instructions;
comparing a first subset of the first linear address to corresponding subsets of linear addresses of the plurality of store instructions in the USQ, to determine a matching store instruction;
comparing a full address of the first linear address to a full linear address of the matching store instruction to determine whether a full matching store instruction is present, in response to a determination of the matching store instruction;
comparing a physical address of the matching store instruction to a physical address of each of the plurality of store instructions of the USQ to determine whether there is a physical address match;
comparing a second subset of the linear address of the matching store instruction to a corresponding subset of the linear address of each of a plurality of store instructions of the USQ to determine whether there is a partial linear address mismatch;
determining that a linear alias is present in response to a determination that there is a physical address match and a partial linear address mismatch; and
blocking data from the matching store instruction from being used for executing the load instruction in response to a determination that the linear alias is present.

11. The method of claim 10, further comprising allowing, based on a determination the linear alias is not present, data from the matching store instruction to be used for executing the load instruction.

12. The method of claim 10, wherein:
comparing the first subset of the first linear address comprises comparing bits 15:0 of the first linear address; and
comparing the second subset of the linear address of the matching store instruction comprises comparing bits 15:12 of the linear address of the matching store instruction.

13. The method of claim 10, further comprising asserting a status bit in the USQ indicating a not-forwardable status for blocking usage of data from the matching store instruction from being used for execution of the load instruction, in response to a determination that the linear alias is present.

14. The method of claim 10, further comprising forwarding data for execution of the load instruction, in response to a determination that a plurality of store instructions do not map to a single physical memory location.

15. The method of claim 10, further comprising:
checking a status bit of the matching store instruction;
determining whether the status bit indicates a non-forwardable state;
blocking data relating to the matching store instruction from being forwarded for execution, in response to a determination that the status bit indicates the non-forwardable state.

16. An integrated circuit device, comprising:
a hardware processor for executing an instruction;
a queue unit in communication with the processor that is configured to:
receive a linear address for a load to execute the instruction;
compare a subset of the linear address to a subset of a linear address of each store instruction of a plurality of store instructions located in the queue unit to determine whether there is a match;
responsive to determining a match, determine whether the linear address for the load matches the linear address of a store instruction of the plurality of store instructions in the queue unit;
responsive to determining an address match, check whether one or more status bits of the store instruction are set, wherein the one or more status bits are set upon a determination of a physical address match and a partial linear address mismatch between the store instruction and a different store instruction of the plurality of store instructions; and
forward data associated with the store instruction of the plurality of store instructions for executing the instruction in response to determining that the one or more status bits of the store instruction are not set.

17. The integrated circuit device of claim 16, further comprising:
a linear aliasing logic configured to determine whether a plurality of linear addresses in the queue unit map to a single physical address, and to block forwarding of data associated with store instructions containing linear addresses that map into the single physical address.

18. The integrated circuit device of claim 16, wherein the queue unit further comprises:
a dispatch pointer configured to insert a new store instruction into the queue unit;
a load pointer configured to indicate a location in the queue unit to retrieve new load instructions;
a head pointer configured to indicate an oldest store instruction in the queue unit; and
a non-speculative pointer configured to indicate which of the plurality of store instructions are speculative.

19. A non-transitory computer-readable medium storing instructions, which when executed by at least one processor, perform a method comprising:
selecting a load instruction for execution, wherein the load instruction is associated with a full linear address;
determining whether a subset of the full linear address associated with the load instruction matches a subset of a linear address of a store instruction of a plurality of store instructions in a unified store queue (USQ), wherein the plurality of store instructions is queued in an order determined by a pointer associated with the USQ, and wherein the subset of the full linear address is a number of bits that is fewer than a number of bits of the full linear address;
responsive to determining that an address match exists between the subset of the full linear address of the load instruction and the subset of the linear address of the store instruction, and a match exists between the full linear address of a load instruction and a full linear address of the store instruction, checking whether one or more status bits of the store instruction is set, wherein the one or more status bits are set upon a determination of a physical address match and a partial linear address mismatch between the store instruction and a different store instruction of the plurality of store instructions; and canceling forwarding of data associated with the store instruction of the plurality of store instructions to complete execution of the selected load instruction in response to determining that the one or more status bits of the store instruction is set.

20. The non-transitory computer-readable medium of claim 19, the method further comprising:

broadcasting a physical address and a subset of a linear address of a new store instruction to the USQ;

comparing a physical address and a subset of a linear address of each store instruction of the plurality of store instructions in the USQ to the physical address and the subset of the linear address of the new store instruction; and asserting a signal indicating detection of a linear alias, in response to the physical address of the new store instruction matching the physical address of the store instruction of the plurality of store instructions in the USQ, and the subset of the linear address of the new store instruction not matching the subset of the linear address of the store instruction.

* * * * *